United States Patent [19]

Bennett et al.

[11] 4,032,512
[45] June 28, 1977

[54] PROCESS FOR THE PREPARATION OF POLYPHENYLENE ETHERS AT ELEVATED PRESSURE

[75] Inventors: James G. Bennett; Glenn D. Cooper, both of Delmar, N.Y.

[73] Assignee: General Electric Company, Pittsfield, Mass.

[22] Filed: Apr. 1, 1975

[21] Appl. No.: 564,127

Related U.S. Application Data

[63] Continuation-in-part of Ser. No. 401,985, Oct. 1, 1973, abandoned.

[52] U.S. Cl. .............................................. 260/47 ET
[51] Int. Cl.² ....................................... C08G 65/44
[58] Field of Search ................................. 260/47 ET

[56] References Cited

UNITED STATES PATENTS 3,262,911   7/1966   Hay .................................. 260/47 ET
3,733,299   5/1973   Cooper ............................. 260/47 ET

FOREIGN PATENTS OR APPLICATIONS 295,781   4/1971   U.S.S.R.

*Primary Examiner*—Paul R. Michl
*Attorney, Agent, or Firm*—William F. Mufatti; Edward A. Hedman; James V. Costigan

[57] ABSTRACT

An improved process is provided for preparing polyphenylene ethers by oxidatively coupling a di-ortho substituted phenolic precursor in a reaction system containing oxygen at a pressure of more than one atmosphere, and a complex catalyst formed from a cupric halide and a primary or secondary amine catalyst.

11 Claims, No Drawings

PROCESS FOR THE PREPARATION OF POLYPHENYLENE ETHERS AT ELEVATED PRESSURE

This application is a continuation-in-part of Ser. No. 401,985, filed Oct. 1, 1973 now abandoned.

This invention relates to an improved process for forming a polyphenylene ether which is based on the oxidative coupling of a phenolic compound in the presence of oxygen at a pressure greater than one atmosphere and a complex catalyst that is formed from a cupric halide and a primary or secondary amine.

BACKGROUND OF THE INVENTION

The polyphenylene ethers and processes for their preparation are known in the art and are described in numerous publications including the Hay patents, U.S. Pat. Nos. 3,306,814 and 3,306,875. Also the Bennett and Cooper patents, U.S. Pat. Nos. 3,639,656, 3,642,699 and 3,661,848 describe processes for the preparation of polyphenylene ethers. All of these patents are incorporated by reference.

In general, the prior art processes involve the oxidative self-condensation of a monovalent phenolic precursor using oxygen and a catalyst comprising an amin-copper salt complex. Phenols which are polymerized by the process are monovalent phenols having substitution in at least the two ortho positions and hydrogen or halogen in the para position. By way of illustration, they correspond to Formula I:

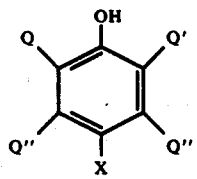

where X is a substituent selected from the group consisting of hydrogen, chlorine, bromine and iodine, Q is a monovalent substituent selected from the group consisting of hydrocarbon radicals, halohydrocarbon radicals having at least two carbon atoms between the halogen atom and the phenol nucleus, hydrocarbonoxy radicals and halohydrocarbonoxy radicals having at least two carbon atoms between the halogen atom and the phenol nucleus; and Q' and Q'' are the same as Q and in addition, halogen, with the proviso that Q, Q' and Q'' are all free of a tertiary alpha-carbon atom. Polymers formed from the above-noted phenols will therefore correspond to Formula II:

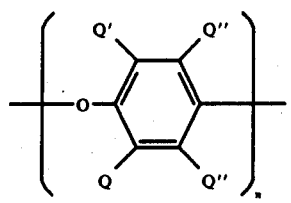

where the oxygen ether atom of one repeating unit is connected to the phenylene nucleus of the next repeating unit; Q, Q' and Q'' are as above defined; and $n$ is a whole integer equal to at least 50.

According to the process of the Hay patents, the formation of the polyphenylene ethers involves the self-condensation of the phenolic compound in the presence of oxygen and a catalyst system comprising an amine-basic salt complex. Various methods are reported for forming the complex catalysts starting with the copper salts. For example, a reducing agent can be used with a cupric salt to form the cuprous salt in situ, which in turn forms the amine-basic salt complex when admixed with the amine. Alternatively, the complex can be formed between an amine and a basic cupric salt formed by reacting cupric salts with an alkaline salt of a phenol, by treating a cupric salt with an ion exchange resin having exchangeable hydroxyl groups, by adding a base to a cupric salt, or by adding cupric hydroxide to a cupric salt. For full details regarding the preparating of such complexes from copper salts and amines and their use in the oxidative coupling of phenols, reference is made to the above-mentioned Hay patents.

In general, all of the prior art processes which have employed a copper catalyst have been carried out at atmospheric pressure. The Hay patents mention that subatmospheric pressure may be employed as a means of removing water that is formed in the reaction. There is no mention of the use of super-atmospheric pressure. U.S. Pat. No. 3,573,257 shows the use of a pressure of 2 kg/cm$^2$ in connection with a manganese catalyst for the polymerization of a 2,6-xylenol. There is no mention of the use of a copper-amine catalyst in the disclosed process.

It has now been found that when pressures in the range of 25 psig-300 psig are employed in conjunction with a complex catalyst that is prepared from a cupric halide and a primary or secondary amine, the rate of oxidative polymerization will be substantially increased. This procedure has the obvious advantage that more efficient use of production facilities may be made. In addition, it has been found that the use of increased pressure increases the ratio of carbon-oxygen coupling as distinguished from carbon-carbon coupling which results in the undesirable by-product, tetramethyldiphenoquinone. The use of a pressure of 35 psig reduces the total amount of quinone by 25%.

DESCRIPTION OF THE INVENTION

The above-mentioned advantages are secured by the use of pressures in the range of 25 psig-300 psig when preparing a high-molecular weight polyphenylene ether having a degree of polymerization of at least 50 by oxidatively coupling a monovalent phenol having substitution in at least the two ortho positions and hydrogen or halogen in the para position, using oxygen and a cupric halide-secondary amine catalyst in a closed system with oxygen at a pressure of from 25 to 300 psig.

The pressures which may be employed range from about 25 to about 300 psig. The preferred pressures range from about 25 to 100 psig. The particular cupric halide salt is not critical and cupric chloride or cupric bromide may be employed in conjunction with the selected primary or secondary-amine catalyst component.

The primary and secondary amines include the mono and di-(lower) alkyl amines which have alkyl groups of from 1 to 12 carbon atoms or mixtures of such compounds. Examples of primary amines include n-butylamine, methyl amine, propyl amine, n-hexyl amine and the like. Examples of usable secondary amines include di-methyl amine, di-ethyl amine, di-n-butyl amine, ethylmethyl amine and the like.

The type of pressure vessel used in carrying out the process is not critical and any suitably equipped reactor may be employed. Pure oxygen is preferred for the process but air, oxygen enriched air, or oxygen in combination with helium, argon, nitrogen or other inert gases may be used. If an inert gas is present, it may be necessary to periodically vent the reaction. Suitable solvents are disclosed in the above-noted patents. The secondary amine may be employed at a level of from 2.0 to about 25 moles per 100 moles of said monovalent phenol and the cupric halide comprises from about 0.2 to about 2.5 moles per 100 moles of the monovalent phenol.

In the preferred manner of carrying out the process of the invention, the reaction vessel is first charged with the solvent, cupric halide, the amine and the phenolic monomer. Usually, it is preferred to mix the cupric halide and the amine with a portion of the solvent prior to adding the phenol dissolved in the balance of the solvent. Thereafter, the reaction vessel is pressurized and periodically, the polymerization is monitored by withdrawing a portion of the reaction mixture, recovering the polymer and determining the intrinsic viscosity according to standard techniques.

The polyphenylene ethers prepared by this process are useful for all the purposes disclosed in the Hay patents, such as for the making of molded articles.

DESCRIPTION OF THE PREFERRED EMBODIMENTS

The following examples illustrate the processes of this invention. They are merely illustrative and are not to be construed as limitations on the present invention.

EXAMPLE 1

Pressure reactions were carried out in a Chemco one-gallon stainless steel reactor equipped with an internal cooling coil, thermometer well, oxygen inlet tube, pressure gauge, ports for addition of reagents, and a single four blade turbine stirrer. Samples were withdrawn through a valve in the bottom of the reactor without interrupting the polymerization. Details of a typical reaction are given below:

Catalyst solution was prepared by adding a solution of 0.81 g of cupric bromide in 6 ml of methanol to a solution of 21.8 g of di-n-butyl amine in 50 ml of benzene. The mixture was stirred for five minutes and transferred to the reactor, which had previously been flushed with oxygen. A solution of 140 g of 2,6-xylene in 500 ml of benzene was added, and the remaining catalyst solution and monomer were rinsed into the reactor with 650 ml of benzene. The bearing quill was pressured with nitrogen to 25 psi above the desired operating pressure, the mixture was stirred at 1750 rpm, and oxygen was admitted until the desired pressure was reached. The reaction temperature was maintained at 30° C by circulating water through the cooling coil. At suitable intervals, samples were withdrawn, stirred with 50% aqueous acetic acid and centrifuged. The upper layer was decanted, the polymer was precipitated by the addition of methanol, filtered, and dried under vacuum. Intrinsic viscosities were measured in chloroform solution at 30° C. The experimental results are listed in Table 1.

TABLE 1

EFFECT OF OXYGEN PRESSURE ON POLYMERIZATION RATE

| Solids Wt. % | Catalyst Ratio* | Pressure (psig) | 30 min. | 45 min. | 60 min. | 90 min. | 120 min. | 150 min. | Polymerization Time (to 0.55 dl/g) | Solvent |
|---|---|---|---|---|---|---|---|---|---|---|
| 10.5 | 300:1:45 | 0 | — | — | — | .54 | .63 | — | 92 min. | Benzene |
| 10.5 | " | 5 | — | — | .43 | .61 | .69 | — | 75 min. | " |
| 10.5 | " | 15 | — | — | .62 | .74 | .81 | — | 55 min. | " |
| 10.5 | " | 25 | .42 | .58 | .66 | .79 | .87 | — | 42 min. | " |
| 10.5 | " | 35 | .52 | .66 | .72 | .81 | .88 | — | 33 min. | " |
| 10.5 | 600:1:45 | 35 | — | — | .20 | .34 | .43 | .48 | 150 min. | " |
| 21 | " | 0 | — | — | — | — | .36 | .42 | 150 min. | " |
| 21 | " | 35 | — | — | .29 | .49 | .60 | .66 | 150 min. | " |
| 25 | 400:1:45 | 10 | — | — | .38 | .48 | .52 | — | | Trichloroethylene |
| 25 | " | 35 | — | — | .50 | .56 | .60 | — | | " |

*xylenol: copper salt: amine

EXAMPLE 2

Catalyst solution was prepared as described in Example 1 from 1.23 g of cupric bromide, 32.3 g of di-n-butylamine, and 12 ml of methanol. The catalyst was transferred to the reactor with 880 ml of benzene, and stirred under an oxygen pressure of 35 psig. A solution of 280 g of 2,6-xylenol in 320 ml of benzene was added through a Milton-Roy pump over a period of 58 minutes. The reaction temperature was maintained at 30° C during the first 50 minutes and then was allowed to rise to 40° C and was kept there for the remainder of the reaction. After a total reaction time of 105 minutes, the polymer solution was withdrawn. A 4 ml portion was shaken with 0.2 ml of 50% aqueous acetic acid and diluted with 8 ml of trichloroethylene. An aliquot of the clear solution was diluted with trichloroethylene and the concentration of tetramethyldiphenoquinone was determined by measurement of the intensity of the absorption at 420 m$\mu$. The tetramethyldiphenoquinone, determined in this way, was equivalent to 0.42% of the total xylenol reacted.

EXAMPLE 3

The reaction was carried out in the same way as Example 2, except that oxygen was added at atmospheric pressure. The concentration of tetramethyldiphenoquinone corresponded to 0.55% of the monomer used.

EXAMPLE 4

Catalyst was prepared by mixing 0.50 g of cupric chloride and 0.78 g of sodium bromide in 6 ml of methanol. The mixture was stirred with a solution of 21.8 g of di-n-butylamine in 50 ml of toluene and the catalyst way transferred, with 950 ml of toluene, to the one gallon reactor described in Examples 1-3. The reactor was flushed with oxygen, pressurized to 35 psig with oxygen, and a solution of 140 g of 2,6-xylenol in 164 ml toluene was added over a period of 15 minutes, with vigorous stirring, as described in the previous examples. At 60 minutes after the beginning of the reaction the reaction mixture was stirred with 50% aqueous acetic acid and the polyphenylene ether was isolated from the toluene solution by the addition of methanol. The polymer had an intrinsic viscosity of 0.54 dl/g in chloroform at 30° C.

In a similar reaction carried out at atmospheric pressure the intrinsic viscosity after one hour was 0.23 dl/g.

We claim:

1. In a process for the preparation of a high-molecular weight polyphenylene ether having a degree of polymerization of at least 50 by oxidatively coupling a monovalent phenol having substitution in at least the two ortho positions and hydrogen or halogen in the para position using oxygen, a cupric halide and a primary or secondary amine catalyst as an oxidizing agent, the improvement which consists of carrying out the oxidation in a closed system with oxygen at a pressure between 25 and 300 psig.

2. A process as defined in claim 1 wherein said polyphenylene ether is of the formula

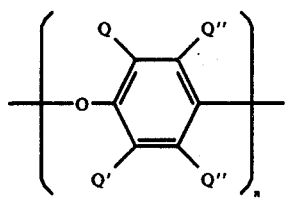

wherein Q is a hydrocarbon radical, a halohydrocarbon radical having at least two carbon atoms between the halogen and the phenol nucleus, a hydrocarbonoxy radical having at least two carbon atoms between the halogen atom and the phenol nucleus; and Q' and Q'' are the same as Q and, in addition, halogen provided that Q, Q' and Q'' are all free of a tertiary alphacarbon atom and $n$ is at least 50.

3. A process as defined in claim 2 wherein Q and Q' are hydrocarbon radicals having from 1 to 8 carbon atoms and Q'' are each hydrogen.

4. A process as defined in claim 3 wherein Q and Q' are each methyl radicals.

5. A process as defined in claim 5 wherein the pressure is in the range of about 25 to 100 psig.

6. A process as defined in claim 1 wherein the cupric halide is cupric bromide.

7. A process as defined in claim 1 wherein the amine is a mono or di-alkyl amine having alkyl groups of from 1 to 12 carbon atoms or a mixture of such compounds.

8. A process as defined in claim 1 wherein the secondary amine is present at a level of from 2.0 to about 25 moles per 100 moles of said monovalent phenol and the cupric halide comprises from about 0.2 to about 2.5 moles per 100 moles of the monovant phenol.

9. A process as defined in claim 1 wherein the cupric halide is cupric chloride and the catalyst also includes sodium bromide.

10. In a process for the preparation of high molecular weight poly(2,6-dimethyl-1,4-phenylene ether) having a degree of polymerization of at least 50 by oxidatively coupling 2,6-xylenol, using oxygen, a cupric halide and a primary or secondary amine catalyst as an oxidizing agent, the improvement which consists of carrying out the oxidation in a closed system with oxygen at a pressure of 35 psig.

11. The process of claim 10 wherein the reaction mixture is pressurized with nitrogen.

* * * * *